US012728874B2

(12) United States Patent
Demir et al.

(10) Patent No.: US 12,728,874 B2
(45) Date of Patent: Sep. 8, 2026

(54) X-BY-WIRE CONTROL SYSTEM FOR A MOTOR VEHICLE

(71) Applicant: HELLA GmbH & Co. KGaA, Lippstadt (DE)

(72) Inventors: Hueseyin Demir, Lippstadt (DE); Olaf Husberg, Warburg (DE); Christian Iseke, Paderborn (DE); Sergey Orlov, Paderborn (DE); Christoph Wostmann, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 55 days.

(21) Appl. No.: 18/892,511

(22) Filed: Sep. 22, 2024

(65) Prior Publication Data

US 2025/0100571 A1 Mar. 27, 2025

(30) Foreign Application Priority Data

Sep. 21, 2023 (DE) ..................... 10 2023 125 680.7

(51) Int. Cl.

| | |
|---|---|
| ***B60W 50/10*** | (2012.01) |
| ***B60W 10/18*** | (2012.01) |
| ***B60W 10/20*** | (2006.01) |
| ***B60W 50/08*** | (2020.01) |

(52) U.S. Cl.

CPC ............ *B60W 50/10* (2013.01); *B60W 10/18* (2013.01); *B60W 10/20* (2013.01); *B60W 50/085* (2013.01)

(58) Field of Classification Search

CPC ...... B60W 60/00; B60W 10/20; B60W 50/10; B60W 50/04

See application file for complete search history.

(56) References Cited

U.S. PATENT DOCUMENTS

| | | | | |
|---|---|---|---|---|
| 11,940,467 | B2 | 3/2024 | Rebholz-Goldmann et al. | |
| 11,989,334 | B2 | 5/2024 | Meyer | |
| 2017/0151979 | A1* | 6/2017 | Maeda | B62D 5/0481 |
| 2019/0340116 | A1* | 11/2019 | Miyauchi | G06F 11/203 |
| 2021/0078556 | A1* | 3/2021 | Laine | B60T 13/683 |
| 2021/0276613 | A1* | 9/2021 | Beres | B62D 5/046 |

(Continued)

FOREIGN PATENT DOCUMENTS

| | | | |
|---|---|---|---|
| DE | 10359875 | A1 | 7/2005 |
| DE | 102018204598 | A1 | 10/2019 |
| DE | 102019209355 | A1 | 12/2020 |

*Primary Examiner* — Long T Tran

(74) *Attorney, Agent, or Firm* — Muncy, Geissler, Olds & Lowe, P.C.

(57) ABSTRACT

An X-by-wire control system of a motor vehicle for the control of a main function of the motor vehicle and a secondary function of the motor vehicle which is rated lower by the safety standard to be met in comparison with the main function. The main function can be carried out via a main function assembly of the motor vehicle and the secondary function can be carried out via a secondary function assembly of the motor vehicle, which is spatially separated from the main function assembly. At least one sensor of the secondary function assembly is functionally assigned to the main function. This at least one sensor of the secondary function assembly assigned to the main function on the one hand is only in power supply connection with the main function assembly for supplying operating energy to this sensor and on the other hand in signal exchange connection.

11 Claims, 3 Drawing Sheets

(56) References Cited

U.S. PATENT DOCUMENTS

| | | | | |
|---|---|---|---|---|
| 2022/0242424 | A1* | 8/2022 | Saenz | B60W 10/06 |
| 2023/0257021 | A1* | 8/2023 | Vér | H04B 3/548 702/41 |
| 2023/0406408 | A1* | 12/2023 | Kim | B62D 6/008 |
| 2024/0007450 | A1* | 1/2024 | Riedinger | H04L 63/0485 |
| 2025/0083741 | A1* | 3/2025 | Yang | B60L 15/00 |

* cited by examiner

X-BY-WIRE CONTROL SYSTEM FOR A MOTOR VEHICLE

This nonprovisional application claims priority under 35 U.S.C. § 119(a) to German Patent Application No. 10 2023 125 680.7, which was filed in Germany on Sep. 21, 2023, and which is herein incorporated by reference.

BACKGROUND OF THE INVENTION

Field of the Invention

The present invention relates to an X-by-wire control system for a motor vehicle.

Description of the Background Art

X-by-wire control systems for motor vehicles are already known from the conventional art in numerous design variants. The known X-by-wire control systems for motor vehicles are used to control a main function of the motor vehicle and a secondary function of the motor vehicle that is classified lower by the safety standard to be met in comparison with the main function. The main function is performed by a main function assembly of the motor vehicle and the secondary function by a secondary function assembly of the motor vehicle, which is spatially separated from the main function assembly, and whereby at least one sensor of the secondary function assembly is functionally assigned to the main function.

This is where the present invention comes in.

SUMMARY OF THE INVENTION

It is therefore an object of the present invention to improve an X-by-wire control system for a motor vehicle.

This object is achieved by an X-by-wire control system for a motor vehicle in that a sensor of the secondary function assembly assigned to the main function is only connected to the main function on the one hand in power supply connection to supply this sensor with operating energy and on the other hand in signal exchange connection. The term "main function" here can refer to functions of the motor vehicle that are elementary for the motor vehicle, wherein these can be understood in particular as safety-relevant functions of the motor vehicle, such as the steering, the drive or the brake system of the motor vehicle. These main functions of the motor vehicle, for example the main functions mentioned above, must be carried out redundantly due to their safety relevance, for example. This means that the redundantly executed main function can also be executed safely in the event of a fault, for example a failure of a component of the main function assembly that performs this main function, since this faulty component is automatically replaced by a corresponding redundant component for the execution of the main function in the event of a fault or, in the case of redundant structures working in parallel, that the faulty component is automatically deactivated, while the properly functioning component, redundant to the faulty component, remains in operation. The term "secondary function" here refers to functions of the motor vehicle according to the invention which are in particular not safety-relevant and therefore do not have to be redundant, for example. The subclaims relate to advantageous further developments of the invention. In this context, spatial separation is to be understood in particular as such a spatial separation of the main function assembly and the secondary function assembly, which does not allow for any kind of structural grouping of these assemblies.

A major advantage of the X-by-wire control system according to the invention lies in particular in the fact that an X-by-wire control system for a motor vehicle is improved. The at least one sensor functionally assigned to the main function is therefore structurally assigned to the secondary function assembly on the one hand and functionally assigned to the main function on the other, as well as in terms of its energy supply and signal exchange. Due to the design of the X-by-wire control system according to the invention, a complete functionality of the X-by-wire control system is ensured, despite a reduced technical effort by system areas constructed separately from each other with regard to the degree of the safety standard to be met. Furthermore, less installation space is required for the X-by-wire control system according to the invention as compared to functionally equivalent X-by-wire control systems from the prior art, since in the X-by-wire control system according to the invention, for example, significantly fewer components have to be designed redundantly. See, for example, FIG. 1, which reflects the prior art, together with the relevant explanations. Thus, the X-by-wire control system according to the invention is more compact and cost-effective as compared to the prior art. Also, the networking of the individual components of the X-by-wire control system according to the invention is less complex and thus far less susceptible to failure, since, for example, redundant functions and thus redundant components of the X-by-wire control system according to the invention are only provided where they are absolutely necessary. As a result, the invention achieves a mechanical and electronic arrangement that is functionally just as powerful as the prior art, but significantly simplified. This also applies to electronic connection technology.

The X-by-wire control system of a motor vehicle according to the invention can be freely selected according to type, function, material and dimension within wide suitable limits. For example, they refer here to motor vehicles designed as electric vehicles. See the multitude of different functions in modern motor vehicles and the challenges of X-by-wire systems in general.

A particularly advantageous further development of the X-by-wire control system according to the invention provides that the safety standard of the main function and the secondary function is developed as an ASIL safety level, wherein the ASIL safety level of the main function is formed as ASIL D and the ASIL safety level of the secondary function is lower than ASIL D, preferably lower than or equal to ASIL B. In this way, the most relevant safety standard for motor vehicles in the context of the invention is indicated. The abbreviation "ASIL" stands for Automotive Safety Integrity Level. ASIL is currently divided into a total of four safety levels A to D, with safety level A being the lowest safety level and safety level D being the highest safety level. A particularly advantageous example of the invention is specified, since here there is a considerable difference in the safety-related requirements for the secondary function as compared to the main function, so that the secondary function can be realized with much less effort than the main function.

Another advantageous further development of the X-by-wire control system according to the invention provides that the X-by-wire control system is designed as a steer-by-wire control system, preferably that the steer-by-wire control system is designed as a steering system of the motor vehicle, wherein the controlled secondary function is designed as a steering wheel feedback function for the mechanical action via a steering wheel of the motor vehicle on a driver of the motor vehicle and the controlled main function of the vehicle as a wheel steering function for steering at least one wheel of the motor vehicle as a function of the steering angle of the steering wheel taken by the driver. This makes the invention advantageous in a field that is particularly sensitive for motor vehicles in terms of safety. In the case of steering systems of motor vehicles, the X-by-wire control system according to the invention is particularly advantageous, since there is no longer any mechanical connection between the steering wheel on one side and the at least one steerable wheel on the other hand.

An advantageous further development of the X-by-wire control system according to the invention provides that the main function assembly can be arranged on at least one steerable wheel of the motor vehicle in a power-transmitting manner, preferably that the main function assembly is arranged in a power-transmitting manner on a steering axle of the motor vehicle connected to the at least one steerable wheel in a power-transmitting manner. In this way, the required power-transmitting connection between the main function assembly on the one hand and the wheel of the motor vehicle to be steered on the other hand can be implemented in a very simple way in terms of design and production technology.

Further, the X-by-wire control system provides that the secondary function assembly is arranged on the steering wheel of the motor vehicle in a power-transmitting manner, preferably that the secondary function assembly is arranged in a power-transmitting manner on a steering column of the motor vehicle connected to the steering wheel. This also makes it possible to implement the required power-transmitting connection between the secondary function assembly on the one hand and the steering wheel of the motor vehicle on the other hand in a very simple way in terms of design and production technology.

Even further, the X-by-wire control system provides that the X-by-wire control system can be designed as a brake-by-wire control system, preferably that the controlled main function is designed as a wheel brake function for braking at least one wheel of the motor vehicle via a brake actuator of the aforementioned control system as a function of a brake command issued by a driver of the motor vehicle or automatically generated by the control system. The secondary function controlled via the X-by-wire control system according to the invention designed as a brake-by-wire control system may, for example, be a secondary function analogous to the above explanations to an X-by-wire control system according to the invention designed as a steer-by-wire control system.

Another particularly advantageous further development of the X-by-wire control system according to the invention provides that the main function assembly can be designed to be redundant, preferably that the main function assembly has at least two control units, each with at least one computing unit for the evaluation of output signals applied to the respective control unit of at least one sensor of the X-by-wire control system corresponding to the main function and for the control of at least one power electronics of an actuator of the X-by-wire control system corresponding to the main function via control signals as a function of the abovementioned output signals for the performance of this main function of the motor vehicle. In this way, a high safety level of the safety standard used can be implemented in a very effective way, as a very high degree of reliability is guaranteed for the main function via the redundant design of the main function assembly.

Another advantageous further development of the X-by-wire control system according to the invention provides that, with regard to the secondary function assembly, only the at least one sensor of the secondary function assembly assigned to the main function is designed to be redundant, preferably that a first sensor of this at least one sensor is in power transmission connection and signal transmission connection with a first control unit of the main function assembly and a second sensor different from the first sensor of this at least one sensor with a second control unit of the main function assembly, particularly preferably that the secondary function assembly only has a control unit with only a single computing unit for the evaluation of output signals of at least one sensor of the X-by-wire control system corresponding to the secondary function and for the control of a power electronics of an actuator corresponding to the secondary function of the X-by-wire control system via control signals as a function of the abovementioned output signals for the execution of this secondary function of the motor vehicle. This minimizes the complexity of the X-by-wire control system according to the invention, despite maintaining the high safety level of the safety standard used required for the main function. Accordingly, the redundancy is reduced to the components of the X-by-wire control system according to the invention that are relevant for the main function. This applies in particular to this example, in which the at least one sensor functionally assigned to the main function, namely as the first and the second sensor, as well as their respective energetic and signal-related connection to the main function assembly, is designed redundantly. In particular, the design, production and circuit engineering effort in the implementation of the secondary function is minimized.

An advantageous further development of the X-by-wire control system according to the invention provides that the secondary function assembly, corresponding to a further function of the motor vehicle, additionally has at least one additional sensor, one additional power electronics and a corresponding further actuator, and that the aforementioned computing unit, in addition to evaluating output signals of the at least one further sensor applied at this control unit and to controlling the other power electronics of the other actuator via control signals as a function of the aforementioned output signals, is designed to execute this further function of the motor vehicle. In this way, the functionality of the secondary function assembly is increased, so that as a result fewer components and thus less installation space are required for a functional extension of the X-by-wire control system according to the invention.

The further function of the X-by-wire control system according to the invention is also freely selectable according, for example, to type, functioning, material and dimensioning within wide suitable limits. For example, the further function may be designed as another secondary function, for example an air conditioning function for a passenger compartment of the motor vehicle or the like.

The further function can be designed as a steering wheel adjustment function, preferably that the steering wheel adjustment function is suitably designed for adjusting an inclination of the steering wheel and/or for transferring the steering wheel from a storage position of the steering wheel to a usage position of the steering wheel, and vice versa. This indicates a particularly advantageous combination of the secondary function assembly on the one hand and the other function on the other, since the steering wheel adjustment function, similar to the secondary function designed as a steering wheel feedback function, for example, attacks the steering wheel of the motor vehicle in a force transmission.

Furthermore, another particularly advantageous further development of the X-by-wire control system according to the invention provides that the main function assembly and/or the secondary function assembly each comprise a first structural unit and a second structural unit different from the first structural unit, wherein in the first structural unit at least one sensor of the respective assembly, preferably all sensors of the respective assembly, and in the second unit a different remainder of the respective structural unit is structurally integrated. In this way, a very sensible structural subdivision of the main function assembly and/or the secondary function assembly is indicated, since the at least one sensor of the main function can be combined very well in a structural unit that is different from a remainder of the corresponding main function assembly, for example as a sensor package with a plurality of sensors. The same applies to the secondary function assembly, in which both the at least one sensor functionally assigned to the main function and at least one sensor assigned to the secondary function are combined in a different unit from a remainder of the secondary function assembly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 2:
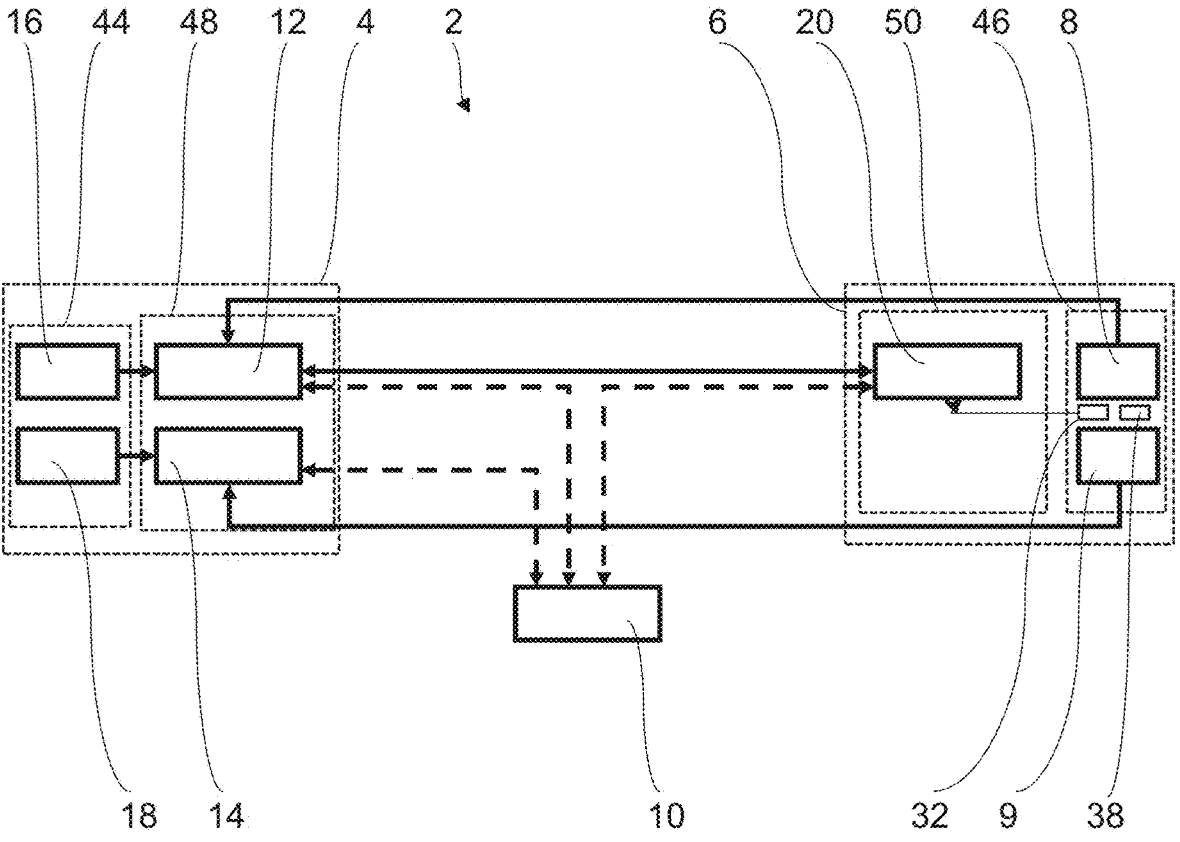
FIG. 2 shows an example of the X-by-wire control system according to the invention in a process circuit diagram analogous to FIG. 1.
Figure 3:
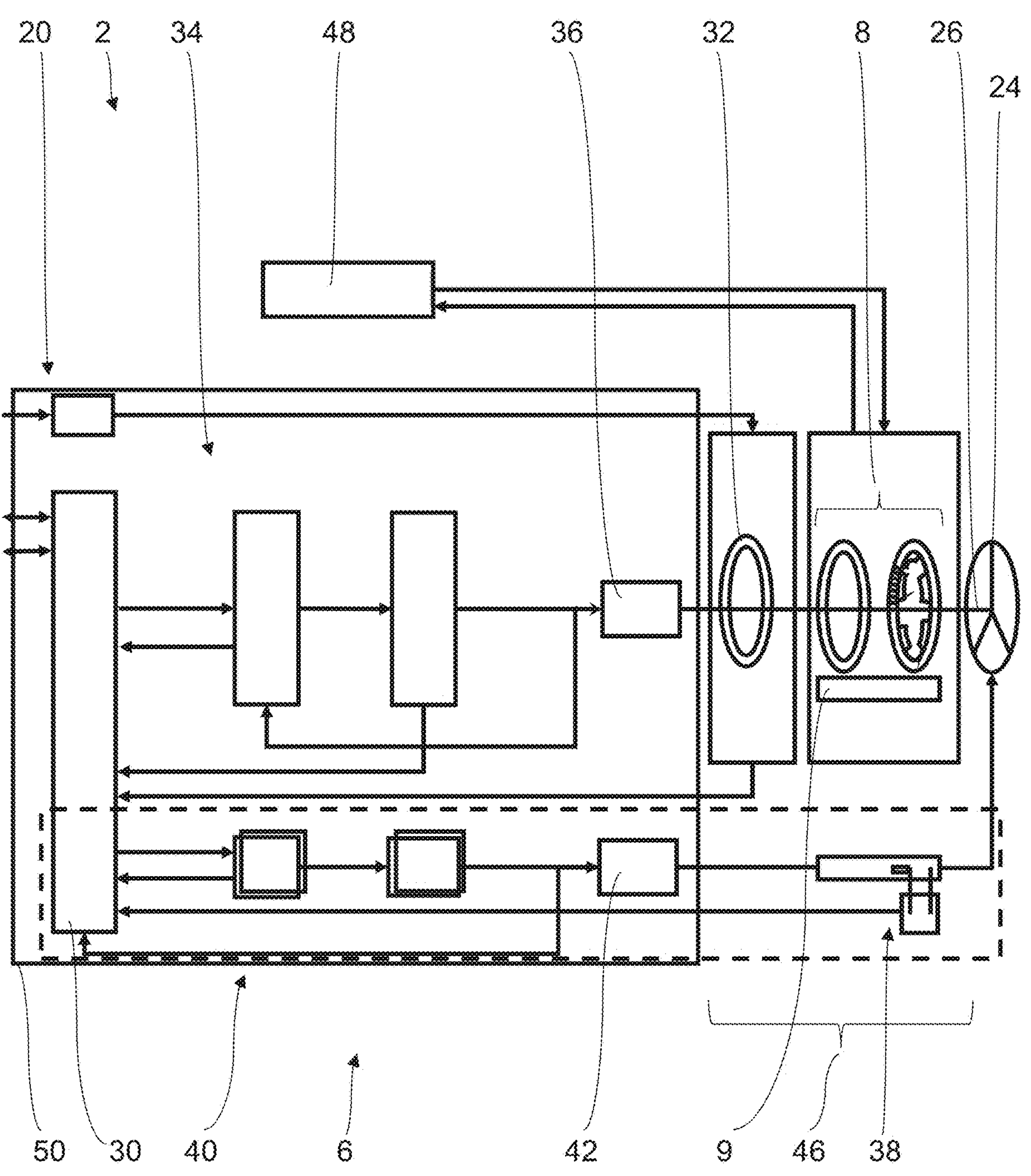
FIG. 3 shows the example according to FIG. 2 in a more detailed, partial process circuit diagram.

FIGS. 2 and 3 show an example of the X-by-wire control system according to the invention purely by way of example.

Figure 1:
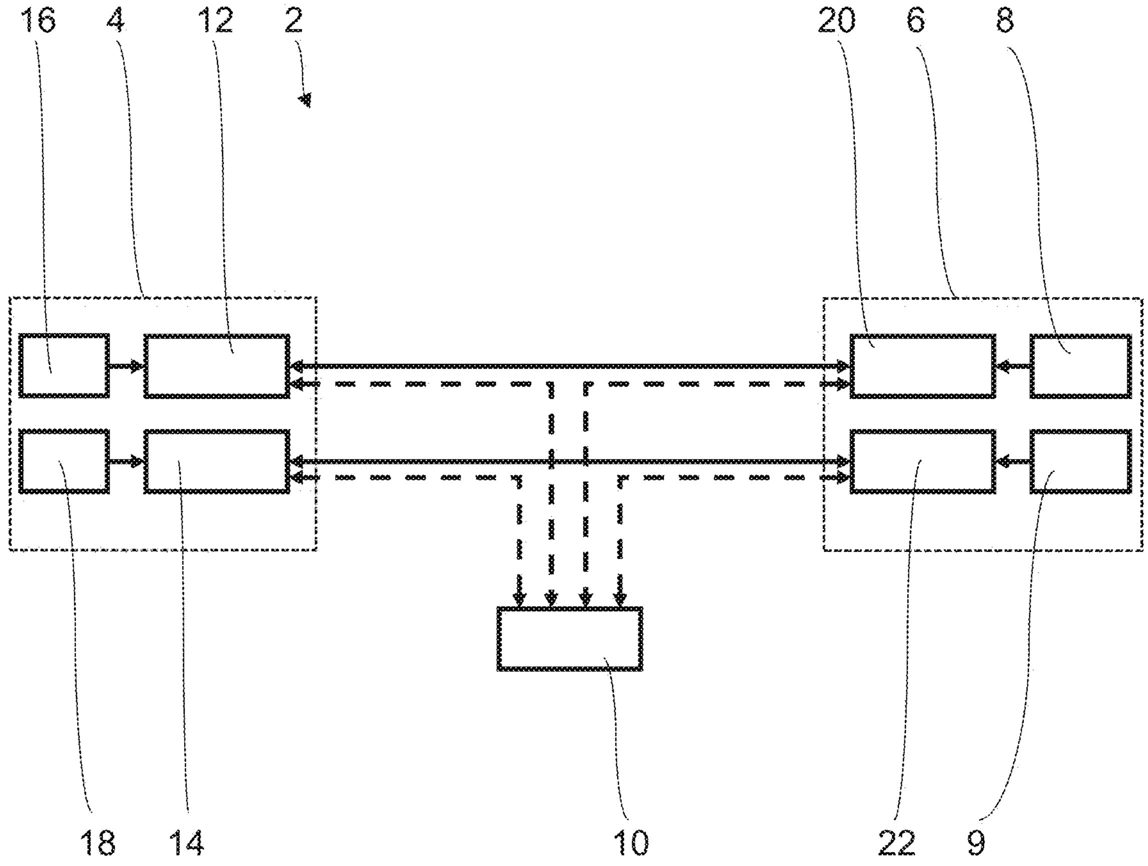
FIG. 1 shows an X-by-wire control system according to the conventional art in a process circuit diagram.

For the purpose of demarcation, the prior art is first shown in FIG. 1. As can be seen from this, the X-by-wire control system 2 of an unspecified motor vehicle, known from the prior art, is suitably designed for the control of a main function of the motor vehicle and a secondary function of the motor vehicle that is classified lower in terms of the safety standard to be met as compared to the main function, wherein the main function can be carried out via a main function assembly 4 of the motor vehicle and the secondary function via a secondary function assembly 6 of the motor vehicle spatially separated from the main function assembly 4, and wherein at least one sensor 8, 9 of the secondary function assembly 6 is functionally assigned to the main function. A remainder of the motor vehicle that is different from the X-by-wire control system 2 is symbolized in FIG. 1 with the reference sign 10.

The X-by-wire control system 2 is designed here as a steer-by-wire control system, wherein the steer-by-wire control system is designed as a steering system of the motor vehicle, and wherein the controlled secondary function is designed as a steering wheel feedback function for mechanical action via a steering wheel of the motor vehicle on a driver of the motor vehicle, and the controlled main function is designed as a wheel steering function for steering at least one wheel of the motor vehicle, as a function of the steering angle of the steering wheel taken by the driver.

In order to meet safety level D, the main function assembly 4 is redundantly designed by a safety standard designed as ASIL, wherein the main function assembly 4 comprises at least two redundant control units 12, 14, each with at least one non-shown computing unit for the evaluation of output signals applied to the respective control unit 12, 14 of at least one sensor 8, 9, 16, 18 of the known X-by-wire control system 2 corresponding to the main function and for the control of at least one power electronics of an actuator of the known X-by-wire control system 2 corresponding to the main function via control signals as a function of the abovementioned output signals for the execution of this main function of the motor vehicle. The main function assembly 4 is also arranged in a power-transmitting manner on at least one steerable wheel of the motor vehicle, wherein the main function assembly 4 is arranged in a power-transmitting manner on a steering axle of the motor vehicle, which is connected to the at least one steerable wheel in a power-transmitting manner.

The secondary function assembly 6 is, analogous to the main function assembly 4, is also redundant, namely in such a way that the secondary function assembly 6 here comprises two redundant control units 20, 22, each with at least one non-shown computing unit for the evaluation of output signals applied to the respective control unit 20, 22 of at least one sensor of the well-known X-by-wire control system 2 corresponding to the secondary function and for the control of at least one power electronics of an actuator of the known X-by-wire control system 2 corresponding to the secondary function via control signals as a function of the aforementioned output signals for the execution of this secondary function of the motor vehicle. The likewise redundant design of the secondary function assembly 6 is required according to the state of the art in order to ensure the abovementioned safety level D for the main function, since the sensors 8, 9 are also functionally assigned to the main function, in addition to the sensors 16, 18. The secondary function assembly 6 is also arranged on the steering wheel of the motor vehicle in a power-transmitting manner, wherein the secondary function assembly 6 is arranged on a steering column of the motor vehicle that is connected to the steering wheel in a power-transmitting manner.

As can be seen from FIG. 1, the sensors 8, 9 assigned to the main function are on the one hand supplied with energy via the control units 20, 22 and on the other hand output signals of the sensors 8, 9 are indirectly forwarded to the main function assembly 4 via the control units 20, 22.

The state-of-the-art design shown in FIG. 1 has various disadvantages. See the relevant explanations in the introduction to the description. This is remedied via the invention according to the example.

In the following, the example of the invention is explained in more detail on the basis of FIGS. 2 and 3. Components with the same or identical effect to the prior art according to FIG. 1, also known as components, are provided with the same reference signs in FIGS. 2 and 3.

Analogous to the prior art according to FIG. 1, the X-by-wire control system 2 of the example is used to control a main function of the motor vehicle and a secondary function of the motor vehicle which is rated lower by the safety standard to be met in comparison with the main function, wherein the main function can be carried out via a main function assembly 4 of the motor vehicle and the secondary function via a secondary function assembly 6 spatially separated from the main function assembly 4, and wherein at least one sensor 8, 9 of the secondary function assembly 6 is functionally assigned to the main function.

According to the invention, this sensor 8, 9 of the secondary function assembly 6, which is assigned to the main function, is only connected to the main function 4 on the one hand in an energy supply connection to supply this sensor 8, 9 with operating energy and on the other hand in a signal exchange connection. See FIG. 2 in this respect.

The safety standard of the main function and the secondary function is also developed here as an ASIL safety level, wherein the ASIL safety level of the main function is formed as ASIL D and the ASIL safety level of the secondary function is lower than ASIL D, namely formed as ASIL B.

Furthermore, according to the present example, the X-by-wire control system 2 is designed as a steer-by-wire control system, analogous to the prior art according to FIG. 1, wherein the steer-by-wire control system is designed as a steering system of the motor vehicle, and wherein the controlled secondary function is designed as a steering wheel feedback function for mechanical action via a steering wheel 24 of the motor vehicle, which is shown only in FIG. 3, on a steering wheel 24 of the motor vehicle, which is only shown in FIG. 3, on a driver of the motor vehicle, and the controlled main function is designed as a wheel steering function for steering at least one wheel of the motor vehicle that is a function of a steering angle of the steering wheel 24 taken by the driver.

The main function assembly 4 is in turn arranged in a power-transmitting manner on the at least one steerable wheel of the motor vehicle, wherein the main function assembly 4 is arranged in a power-transmitting manner on a steering axle of the motor vehicle, connected in a power-transmitting manner to at least one steerable wheel. Furthermore, the main function assembly 4 is also redundantly designed, namely in such a way that the main function assembly 4 comprises two control units 12, 14, each with at least one non-shown computing unit for the evaluation of output signals applied to the respective control unit 12, 14 of at least one sensor 8, 9, 16, 18 of the X-by-wire control system 2, which corresponds to the main function, and for the control of at least one power electronics of an actuator of the X-by-wire control system 2 via control signals as a function of the abovementioned output signals in order to execute this main function of the motor vehicle.

The secondary function assembly 6 is in turn arranged on the steering wheel 24 of the motor vehicle in a power-transmitting manner, wherein the secondary function assembly 6 is arranged on a steering column 26 of the motor vehicle that is connected to the steering wheel 24 in a power-transmitting manner. See FIG. 3. With regard to the secondary function assembly 6 according to the present example of the invention, only the at least one sensor 8, 9 of the secondary function assembly 6 assigned to the main function is redundantly designed, namely in such a way that a first sensor 8 of this at least one sensor 8, 9 is connected to the first control unit 12 of the main function assembly 4 and a second sensor 9, different from this at least one sensor 8, 9, is connected to the second control unit 14 of the main function assembly 4 in a power and signal transmitting manner. In contrast to the main function assembly 4, the secondary function assembly 6 has only one control unit 20 with only a single computing unit 30 for the evaluation of output signals applied to this control unit 20 of at least one sensor 32 of the X-by-wire control system 2 corresponding to the secondary function and for the control of a power electronics 34 of an actuator 36 of the X-by-wire control system 2 corresponding to the secondary function via control signals as a function of the abovementioned output signals in order to perform this ancillary function of the motor vehicle.

Furthermore, as in the present example and corresponding to another function of the motor vehicle, the secondary function assembly 6 may additionally have at least one additional sensor 38, another power electronics 40 and a corresponding further actuator 42, wherein the aforementioned computing unit 30, in addition to evaluating output signals of at least one additional sensor 38 applied to this control unit 20 and controlling the further power electronics 40 of the further actuator 42, is designed to perform this further function of the motor vehicle via control signals as a function of the aforementioned output signals. The further function here is designed as a steering wheel adjustment function, wherein the steering wheel adjustment function is suitably designed for adjusting an inclination of the steering wheel 24 and for transferring the steering wheel 24 from a storage position of the steering wheel 24 to a use position of the steering wheel 24, and vice versa. The components of the secondary function assembly 6 corresponding to the further function are delimited in FIG. 3 via a dashed line. Of course, examples of the invention are also conceivable in which the secondary function assembly does not perform any further function.

The actuators 36, 42 can each be an electric motor; the sensors 8, 9, 16, 18, 32 can each be motor position sensors. The sensors 8, 9 on the one hand and sensors 16, 18 on the other each correspond to a redundancy. The sensors can also be designed at least partially to be multiple, i.e., redundant, in order to further increase redundancy. In particular, the individual sensors 8, 9, 16, 18, 32, 38 can each be based on different physical measurement principles, so that this results in an improvement in reliability on the one hand through this technological diversity of sensors 8, 9, 16, 18, 32, 38 and on the other hand through the aforementioned redundancies. Analogous to the abovementioned components, the electrical lines and the like that connect these components with other components of the X-by-wire control system according to the invention 2 in a power-transmitting and/or signal-transmitting manner can be redundantly designed in a manner known to the skilled person.

In addition, the main function assembly 4 and the secondary function assembly 6 each comprise a first assembly unit 44, 46 and a second assembly unit 48, 50 that is different from the first assembly unit 44, 46, wherein in the first assembly unit 44, 46 all sensors 16, 18 and 8, 9, 32, 38 of the respective assembly unit 4, 6 and in the second assembly unit 48, 50, a remainder of the respective assembly unit 4, 6 different therefrom is structurally integrated. See FIGS. 2 and 3 for a synopsis.

While the main function assembly 4 has the ASIL safety level D as a whole, in the case of the secondary function assembly 6 only the at least one sensor functionally assigned to the main function, namely sensor 8 and the redundantly designed sensor 9, is designed according to ASIL safety level D. In contrast, the second assembly unit 50 and the sensors 32 and 38, which correspond to the secondary function and to the further function, are only designed according to ASIL safety level B.

In the following, the functioning of the X-by-wire control system according to the present example is explained in more detail using FIGS. 2 and 3.

Via the steering wheel feedback function, sensor information is collected on the steering wheel 24 via the at least one sensor 8, 9, 32 in order to generate a feedback torque for the driver via the actuator 36 on the one hand and to make the driver's steering wishes available to the wheel steering function on the other. On the one hand, the steerable vehicle wheels of the motor vehicle are steered via the wheel steering function, and on the other, road conditions are transmitted to the steering wheel feedback function via the wheel steering function. Thus, in the aforementioned way, there is a constant exchange of signals and/or data between the two aforementioned functions of the motor vehicle. In addition, via the additional steering wheel adjustment function, it is possible to adjust the inclination of the steering wheel 24 in the desired way and to transfer it from its use position to its storage position when not in use. If the steering wheel 24 is required, the steering wheel 24 can then be transferred again from its storage position to its use position via the actuator 42.

If, for example, the steering wheel 24 of the motor vehicle is manually rotated around the steering column 26, this steering movement of the steering wheel 24 is detected in a manner known via the at least one sensor 8, 9, 32 functionally connected to the steering wheel 24 and transmitted as output signals of this at least one sensor 8, 9 in a known manner to the corresponding control unit 12, 14 of the X-by-wire control system 2. In order to be able to properly control the actuator's power electronics corresponding to the main function, it is also necessary to know the current steering position of the at least one steerable wheel of the motor vehicle. This current steering position is detected via the at least one sensor 16, 18, which is functionally interacting with the aforesaid actuator, which is also known to the skilled person, and is transmitted as output signals of the sensors 16, 18, analogous to the abovementioned output signals, to the computing units of the two control units 12, 14 for evaluation. After evaluating all output signals, each of the computing units of the control units 12, 14 generates a control signal correlating to these output signals, with which the power electronics of the actuator corresponding to the main function can be controlled. When functioning properly, i.e., in normal operation of the control units 12, 14, the aforementioned control signals are essentially the same.

The same applies to the steering wheel feedback function and the steering wheel adjustment function of the X-by-wire control system 2.

Due to the design of the X-by-wire control system 2 according to the invention, a complete functionality of the X-by-wire control system 2 is guaranteed, despite a reduced technical effort by system areas built separately from each other with regard to the degree of the safety standard to be met. Furthermore, less installation space is required for the X-by-wire control system 2 as compared to functionally equivalent X-by-wire control systems from the state of the art, since in the case of the X-by-wire control system 2 according to the invention, for example, significantly fewer components have to be designed redundantly. See, for example, FIG. 1, which reflects the prior art, along with the relevant explanations. Thus, the X-by-wire control system 2 according to the invention is more compact and cost-effective as compared to the prior art. Also, the networking of the individual components of the X-by-wire control system 2 according to the invention is less complex and thus far less susceptible to failure, since, for example, redundant functions and thus redundant components of the X-by-wire control system 2 according to the invention are only provided where they are absolutely necessary. As a result, the invention achieves a mechanical and electronic arrangement that is functionally just as powerful as the prior art, but significantly simplified. This also applies to the electronic connection technology.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An X-by-wire control system for a motor vehicle to control a main function of the motor vehicle and a secondary function of the motor vehicle that is classified lower by a safety standard to be met in comparison with the main function, the system comprising:

a main function assembly; and a secondary function assembly having at least one sensor;

wherein the main function is adapted to be performed via the main function assembly of the motor vehicle, wherein the secondary function is adapted to be performed via the secondary function assembly of the motor vehicle, the secondary function assembly being spatially separated from the main function assembly, wherein the at least one sensor of the secondary function assembly is functionally assigned to the main function, and wherein the at least one sensor of the secondary function assembly is only connected to the main function assembly in a power supply connection for supplying the at least one sensor of the secondary function assembly with operating power and in a signal exchange connection.

2. The X-by-wire control system according to claim 1, wherein the safety standard of the main function and the secondary function is an ASIL safety level, wherein the ASIL safety level of the main function is formed as ASIL D and the ASIL safety level of the secondary function is lower than ASIL D, or lower than or equal to ASIL B.

3. The X-by-wire control system according to claim 1, wherein the X-by-wire control system is a steer-by-wire control system, the steer-by-wire control system being a steering system of the motor vehicle, wherein the secondary function is a steering wheel feedback function for mechanical action via a steering wheel of the motor vehicle on a driver of the motor vehicle and the main function is a wheel steering function for steering at least one wheel of the motor vehicle depending on a steering angle of the steering wheel turned by the driver.

4. The X-by-wire control system according to claim 3, wherein the main function assembly is arranged in a power-transmitting manner on the at least one wheel of the motor vehicle, or wherein the main function assembly is arranged in a power-transmitting manner on a steering axle of the motor vehicle connected to the at least one wheel in a power-transmitting manner.

5. The X-by-wire control system according to claim 3, wherein the secondary function assembly is arranged in a power-transmitting manner on the steering wheel of the motor vehicle, or wherein the secondary function assembly is arranged in a power-transmitting manner on a steering column of the motor vehicle that is connected to the steering wheel.

6. The X-by-wire control system according to claim 1, wherein the X-by-wire control system is a brake-by-wire control system, with the main function being a wheel brake function for braking at least one wheel of the motor vehicle via a brake actuator of the brake-by-wire control system as a function of a brake command issued by a driver of the motor vehicle or automatically generated by the brake-by-wire control system.

7. The X-by-wire control system according to claim 1, wherein the main function assembly is designed redundantly, such that the main function assembly has at least two control units, each with at least one computing unit for an evaluation of output signals present at the respective control unit of at least one sensor of the X-by-wire control system corresponding to the main function and for the control of at least one power electronics of an actuator corresponding to the main function of the X-by-wire control system via control signals as a function of the output signals in order to perform the main function of the motor vehicle.

8. The X-by-wire control system according to claim 7, wherein, with regard to the secondary function assembly, only the at least one sensor of the secondary function assembly that is functionally assigned to the main function is redundantly designed, wherein a first sensor of the at least one sensor is connected to a first control unit of the main function assembly and a second sensor of the at least one sensor, which is different from the first sensor, is connected to a second control unit of the main function assembly in a power-transmitting and signal-transmitting manner, wherein the secondary function assembly comprises only one control unit with only a single computing unit for evaluating output signals applied to the only one control unit of at least one additional sensor of the X-by-wire control system corresponding to the secondary function and for controlling a power electronics of an actuator of the X-by-wire control system corresponding to the secondary function via control signals as a function of the output signals for the execution of the secondary function of the motor vehicle.

9. The X-by-wire control system according to claim 8, wherein the secondary function assembly, corresponding to a further function of the motor vehicle, further comprises:

at least one further sensor;

a further power electronics; and a corresponding further actuator, wherein the single computing unit additionally evaluates output signals of the at least one further sensor applied to the only one control unit and to control the further power electronics of the further actuator via control signals as a function of the output signals in order to carry out the further function of the motor vehicle.

10. The X-by-wire control system according to claim 9, wherein the further function is a steering wheel adjustment function, the steering wheel adjustment function for adjusting an inclination of a steering wheel and/or for transferring the steering wheel from a storage position of the steering wheel to a use position of the steering wheel, and vice versa.

11. The X-by-wire control system according to claim 1, wherein the main function assembly and/or the secondary function assembly each comprise a first assembly unit and a second assembly unit different from the first assembly unit, wherein in the first assembly unit, at least one sensor of the respective assembly or all sensors of the respective assembly and in the second assembly unit a different remainder of the respective assembly are structurally integrated.

* * * * *